(12) United States Patent
Malzbender et al.

(10) Patent No.: US 7,924,477 B1
(45) Date of Patent: Apr. 12, 2011

(54) AUTOMATED DETECTION OF CREASES AND/OR TEARS IN SCANNED PRINTS

(75) Inventors: Thomas G. Malzbender, Palo Alto, CA (US); Oliver Wang, Santa Cruz, CA (US); Ruth Bergman, Haifa (IL); Justin Tehrani, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 958 days.

(21) Appl. No.: 11/823,491

(22) Filed: Jun. 27, 2007

(51) Int. Cl.
*H04N 1/04* (2006.01)

(52) U.S. Cl. ........ 358/474; 358/497; 358/486; 358/488; 382/318; 382/275

(58) Field of Classification Search .......... 358/474, 358/486, 3.28, 488, 296, 501, 497, 496, 475, 358/509; 382/274, 275, 318, 319
See application file for complete search history.

(56) References Cited

U.S. PATENT DOCUMENTS

| | | | |
|---|---|---|---|
| 5,497,236 A * | 3/1996 | Wolff et al. .............. 358/296 |
| 5,835,241 A * | 11/1998 | Saund ..................... 358/488 |
| 6,297,834 B1 | 10/2001 | Malzbender |
| 6,587,383 B1 * | 7/2003 | Roohparvar et al. .... 365/185.33 |
| 6,654,013 B1 | 11/2003 | Malzbender et al. |
| 6,842,265 B1 | 1/2005 | Votipka et al. |
| 6,856,423 B2 | 2/2005 | Anderson et al. |
| 6,888,544 B2 | 5/2005 | Malzbender et al. |
| 6,891,645 B1 * | 5/2005 | Nakamura ............... 358/474 |
| 6,906,314 B2 | 6/2005 | Harris et al. |
| 6,940,063 B2 | 9/2005 | Spears et al. |
| 6,947,666 B2 | 9/2005 | Chapman et al. |
| 7,019,872 B2 | 3/2006 | Haas et al. |
| 7,064,872 B1 | 6/2006 | Jeran |
| 7,068,402 B2 | 6/2006 | Witte et al. |
| 7,800,788 B2 * | 9/2010 | Yazawa et al. ............ 358/474 |
| 7,830,546 B2 * | 11/2010 | Holub ..................... 358/1.9 |
| 2002/0158192 A1 * | 10/2002 | Gann ....................... 250/234 |
| 2003/0081211 A1 * | 5/2003 | Nishio et al. ............. 356/390 |
| 2006/0109515 A1 * | 5/2006 | Zhao et al. ............... 358/3.28 |
| 2006/0268346 A1 * | 11/2006 | van Os .................... 358/3.26 |
| 2007/0158536 A1 * | 7/2007 | Gann ....................... 250/234 |
| 2010/0259800 A1 * | 10/2010 | Wei et al. ................ 358/475 |

OTHER PUBLICATIONS

Ruth Bergman, et al., "Comprehensive Solutions For Removal Of Dust and Scratches From Images", Feb. 6, 2007, pp. 1-25, Hewlett-Packard Development Company, L.P. Israel.
A. Buades, B. Coll, and J. M. Morel, "A Review of Image Denoising Algorithms, With a New One", 2005, pp. 490-530, Multiscale Model. Simul, vol. 4, No. 2, Society for Industrial and Applied Mathematics.
Alexei A. Efros and Thomas K. Leung, "Texture Synthesis By Non-Parametric Sampling", Sep. 1999, pp. 6 sheets, IEEE International Conference on Computer Vision, Greece.

(Continued)

*Primary Examiner* — Negussie Worku (57) ABSTRACT

Images of a document having a surface are captured. In this process, multiple scan lines respectively illuminated from different illumination angles relative to the document surface are scanned across the document surface in a first scan direction in relation to orientation of the document. Multiple scan lines respectively illuminated from different illumination angles relative to the document surface are scanned across the document surface in a second scan direction in relation to orientation of the document. The captured images are generated from scan line illumination reflected from the document surface during the scanning of respective ones of the scan lines across the document surface. A crease or a tear is detected in the document based on the captured images.

20 Claims, 10 Drawing Sheets

OTHER PUBLICATIONS

T. Hastie, R. Tibshirani and J. Friedman, "The Elements of Statistical Learning—Data Mining, Inference, and Prediction.", 2001, Chapter 4, "Linear Methods for Classification", pp. 79-95, Springer-Velag.

Klette, R., Schluns, K., and Koschan, A., "Computer Vision: Three Dimensional Data from Images", 1998, Chapter 8, pp. 301-345, Springer—Verlag, Germany.

G. Medioni, Mi-Suen Lee and Chi-Keung Tang, "A Computer Framework for Segmentation and Grouping", 2000, Chapter 7, pp. 171-215, Elsevier.

Cyber Rapid 3D Scanners from Cyberware website, p. 1, [retrieved on Jul. 11, 2007] [Retrieved from the internet:<http://www.cyberware.com>.

Tom Malzbender, Dan Gelb and Hans Wolters, "Polynomial Texture Maps", Proceedings of ACM Siggraph, 2001, 10 sheets.

Padfield, J., Saunders, D., and Malzbender, T., "Polynomial Texture Maps: A New Tool For Examining The Surface Of Paintings", 14th Triennial Meeting The Hague Preprints, vol. 1, 2005, pp. 504-510, ICOM Committee for Conservation.

Mudge, M., Malzbender, T., Schroer, C., and Lum, M., "New Reflection Transformation Imaging Methods for Rock Art and Multiple Viewpoint Display", The 7th Internatiuonal Symposium on Virtual Reality, Archaeology and Cultural Heritage 2006, 8 sheets.

Hammer, O., Bengston, S., Malzbender, T., and Gelb, D., "Imaging Fossils Using Reflectance Transformation And Interactive Manipulation Of Virtual Light Sources", Aug. 23, 2002, pp. 9, [retrieved online] [Retrieved from the internet:<http://palaeo-electronica.org/paleo/2002_1/fossil/issue1_02.htm>.

\* cited by examiner

Simultaneous registration and photometric stereo 700

AUTOMATED DETECTION OF CREASES AND/OR TEARS IN SCANNED PRINTS

BACKGROUND

1. Field of the Invention

The present application relates generally to apparatus and methods of image scanning.

2. Description of the Background Art

Scanner devices, such as a flatbed scanner, produce machine-readable image data signals that are representative of a scanned two-dimensional object, typically a photograph or a page of printed text. In a typical scanner application, the image data signals produced by a flat bed scanner may be used by a computer system to reproduce an image of the scanned two-dimensional object on a suitable display device, such as a cathode ray tube ("CRT") or liquid crystal display ("LCD"). The computer system may also print an image of the two-dimensional object on a printer connected to the computer system.

One recent feature of modern scanners is a capability to perform dust and scratch removal from transparent substrates, such as 35 mm slides and negatives. This feature is typically accomplished by scanning the transparency with both conventional visible lighting, and then again with an infrared illumination source. Since the dust and scratches typically appear opaque to infrared illumination, they appear quite distinctly in the resulting infrared image. A mask may be computed from this infrared image that identifies which pixels in the scan have dust and scratch imperfections. Once these pixels are labeled, they may be replaced using "in-filling" and/or "in-painting" methods correcting these imperfections in the resultant scanned image.

It is highly desirable to improve capabilities of scanner devices and image scanning systems.

SUMMARY

One embodiment relates to a method for detecting creases and/or tears in a print using a flatbed scanner. The print is placed with an image to be scanned facing down on a scanner platen. A plurality of scanned images are obtained under differing lighting directions. The scanned images are processed to detect creases and/or tears in the print.

Another embodiment pertains to a scanning apparatus configured to detect creases and/or tears in a print. The apparatus includes at least a scanner platen upon which the print is placed, an imaging device configured to obtain a plurality of scanned images from the print under different lighting conditions, a processor configured to execute computer-readable code, and computer-readable code. The computer-readable control code is configured to process the scanned images to detect creases and/or tears in the print.

Other features and embodiments are also disclosed.

DETAILED DESCRIPTION

Repair of Scanned Damaged Photographs

A useful capability which does not currently exist in the scanner market today is the automated repair of scanned damaged photographs (prints). Damage to prints usually involves either tears or creases on the print.

The previously discussed technique for removing dust and scratches from transparencies does not work very well for detecting such tears or creases in prints.

The present application discloses a novel technique for automated detection of creases and/or tears in scanned prints. Advantageously, the disclosed technique may be implemented with relatively small modifications to an existing scanner apparatus.

The output of the technique disclosed herein may be a bit-mask that identifies which pixels correspond to damaged regions on the print (and so need to be replaced). Thereafter, "in-filling" and/or "in-painting" methods may be used to repair those damaged regions.

Two-Dimensional Scanner

Figure 1:
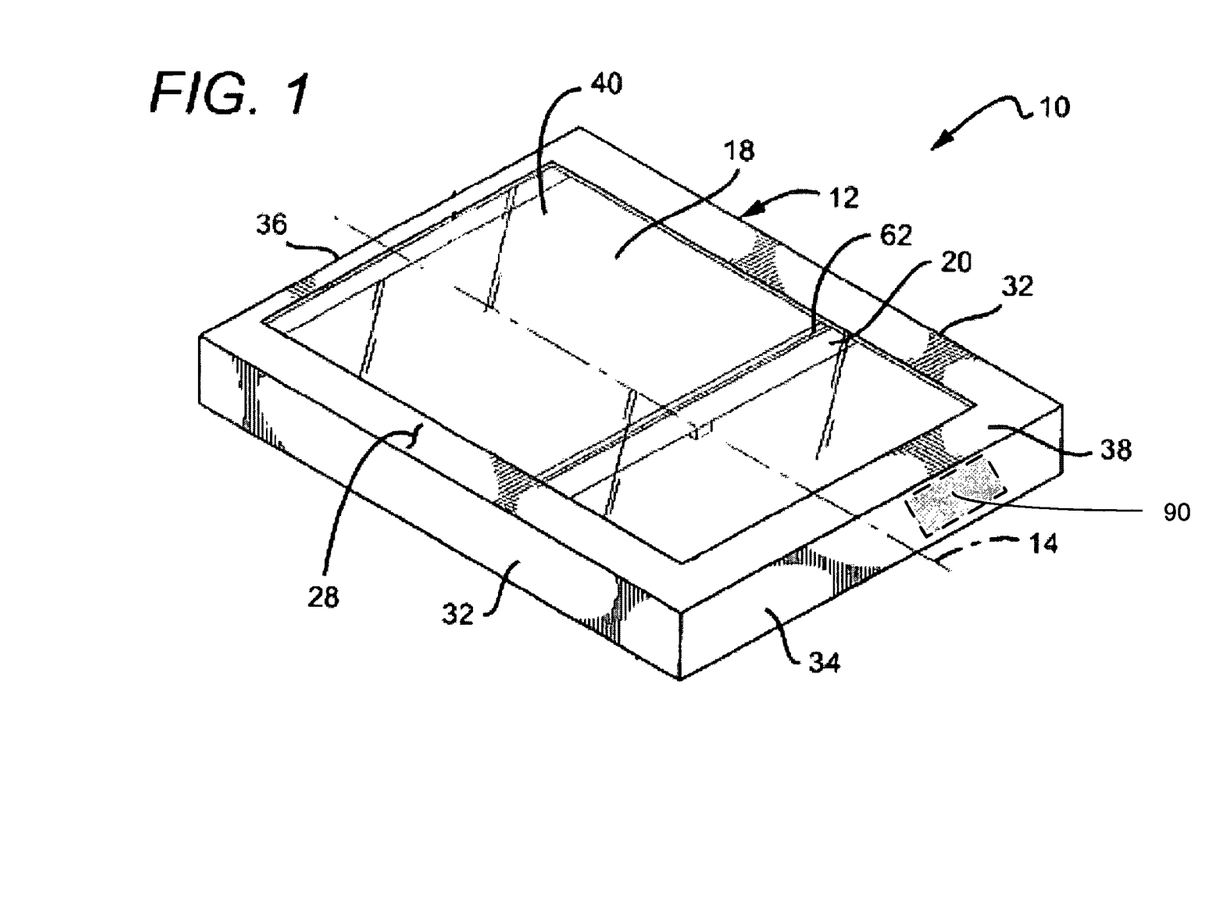
FIG. 1 is a perspective view of a portion of a flatbed two-dimensional scanner.
Figure 2:
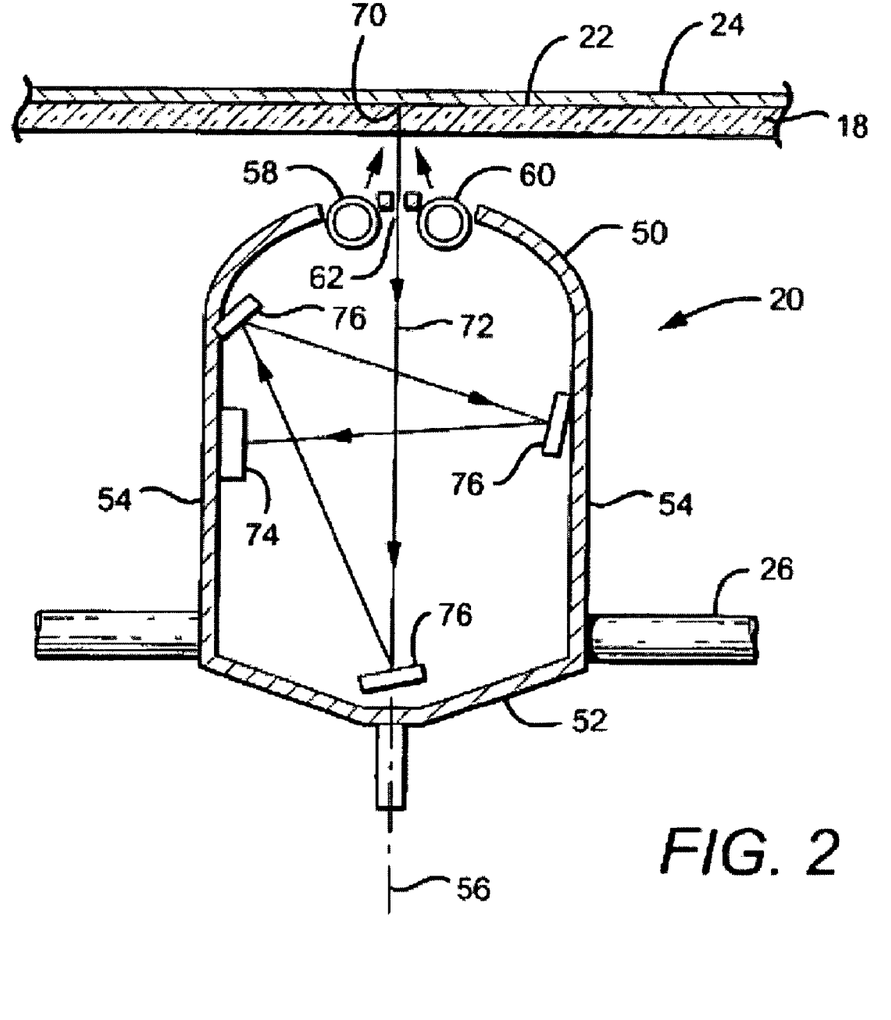
FIG. 2 is a side elevation view, in cross-section, of a movable imaging device forming part of the flatbed scanner of FIG. 1.

With reference to FIGS. 1 and 2, there is shown in schematic form an example of a flatbed two-dimensional scanner 10. The flatbed scanner 10 includes a housing 12 extending along a longitudinal direction 14, a transparent platen 18 supported by the housing 12 and a transversely-extending imaging device 20 under the platen. The platen has a planar, object supporting top surface 22 defining the image plane of an object such as a document 24 to be scanned. The imaging device 20 is adapted to be driven linearly along a pair of spaced-apart, parallel, longitudinally extending rails 26. For simplicity of illustration, the carriage drive, the hinged scanner housing cover and other features are not shown.

The housing 12 is typically a rectangular structure and includes a top wall 28, a bottom wall 30, side walls 32, and front and back walls 34 and 36, respectively. The housing 12 may include a front portion 38 adjacent to the front wall 34 adapted to enclose the scanner control system 90. The top wall 28 of the housing 12 typically has a rectangular opening or frame 40. The perimeter of the platen 18 is attached to the top wall 28 of the housing about the rectangular frame 40.

The imaging device 20, in accordance with one, specific, exemplary embodiment thereof, is depicted in FIG. 2. The imaging device 20 includes an enclosure having an upper convex wall 50, a lower wall 52, and opposed, side walls 54. The device enclosure may be, as in this example, symmetrical about a central axis 56 intercepting the upper and lower walls. Disposed adjacent the upper wall 50 of the device enclosure is a light source comprising a pair of parallel, longitudinally spaced apart, transversely-extending light sources 58 and 60. These light sources may be implemented, for example, using tubular lamps or other light producing devices. The upper wall 50 of the device enclosure further defines a transverse light-receiving slit or aperture 62 positioned between the light sources 58 and 60.

During scanning, the lower surface of an object such as the document 24 placed on the top surface 22 of the platen 18 is illuminated along a transverse linear strip or scan line 70 by both of the light sources 58 and 60. A beam 72 of light reflected from the illuminated scan line extends along the central axis 56 and passes through the light-receiving aperture 62 to a photodetector array 74 via a system of mirrors 76. The photodetector array 74 may be, for example, a linear charge-coupled device (CCD) array.

Method of Scanning

The present application discloses a method of crease and/or tear detection in scanned prints. In accordance with an embodiment of the invention, the method may use the 2D scanner apparatus hardware described above in relation to FIGS. 1 and 2, with certain modifications to the control software of the scanner. Some additional user action may also be required to rotate the object. Alternate embodiments may utilize different scanner apparatus.

Figure 3:
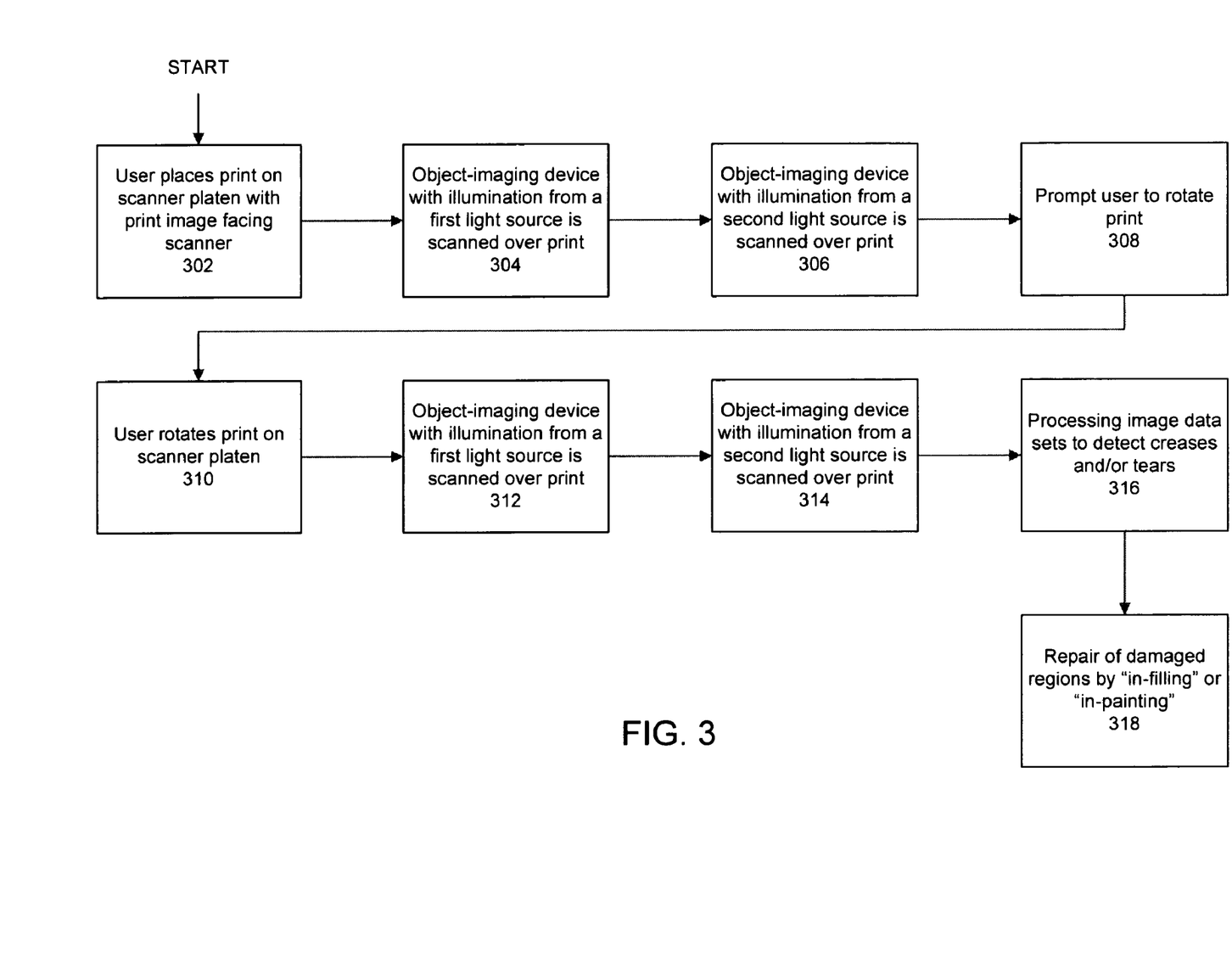
FIG. 3 is a flow chart of a method for scanning using scanner hardware in accordance with an embodiment of the invention.
Figure 4:
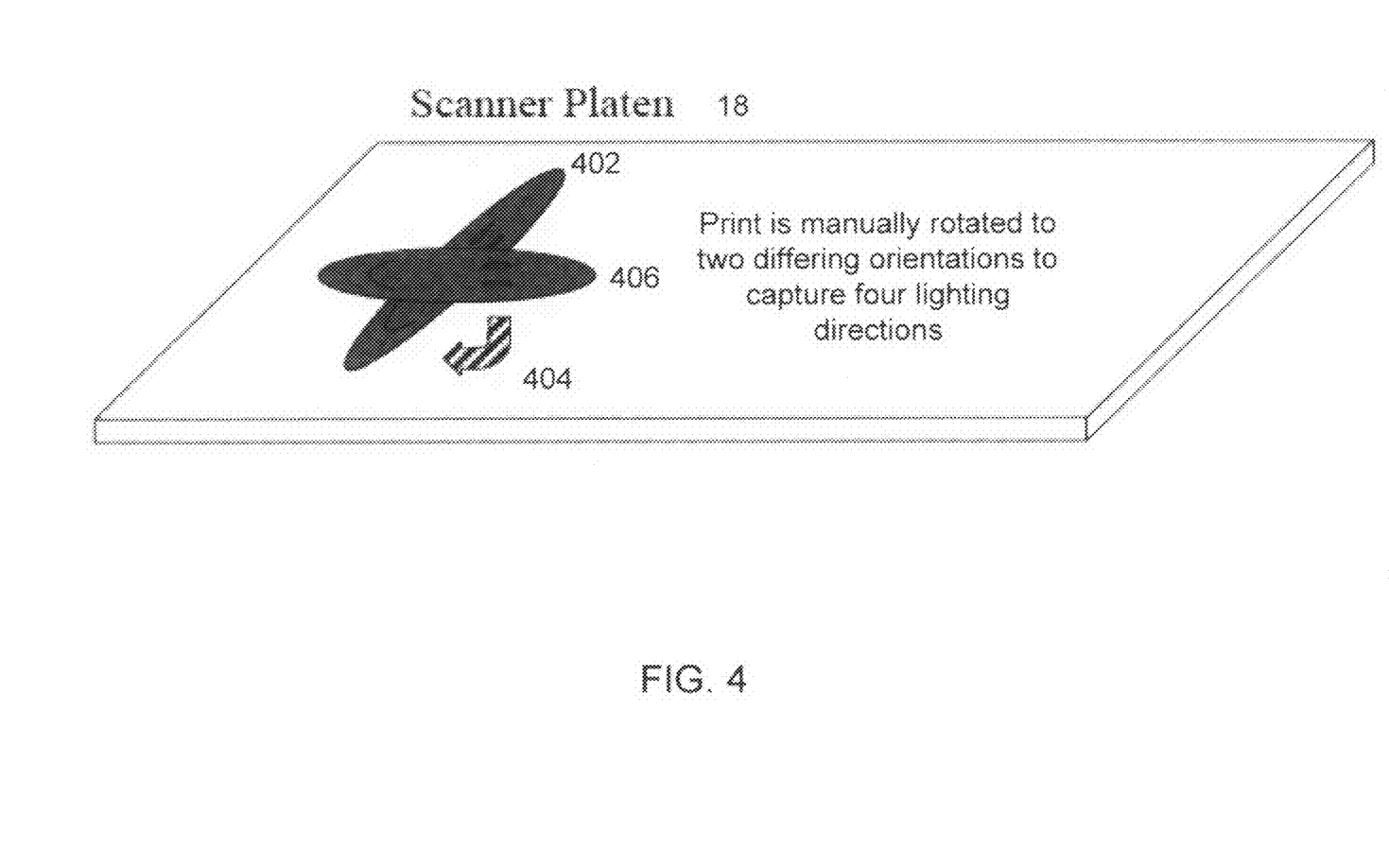
FIG. 4 is an illustration of the scanning technique of FIG. 3 from a user's point of view.

FIG. 3 is a flow chart of a method 300 for scanning using 2D scanner hardware in accordance with an embodiment of the invention. FIG. 4 is an illustration of the scanning technique of FIG. 3 from a user's point of view. The method 300 may be performed, in part, using computer-executable instructions configured to control the scanner and process data. The computer-executable instructions may be, for example, stored at a data storage device and executed by a processor within the scanner control system 90.

With reference to the first block 302 in FIG. 3 and FIG. 4A, a user places a print 402 on the scanner platen 18. The print 402 is placed with the side having the print image of interest facing down on the scanner platen 18. In other words, the print 402 is placed with the image to be scanned facing towards the imaging device 20. Two scans are then performed by the scanner 10 with the print 402 in this position.

With reference to the second block 304 in FIG. 3, in the first scan, only a first transversely-extending light source (for example, light source 58) is turned on, while a second transversely-extending light source (for example, light source 60) is off. During the scan, the imaging device 20 is moved along the longitudinal direction 14 across the print 402 while a first set of image data is obtained from the photodetector array 74.

With reference to the third block 306 in FIG. 3, in the second scan, only the second transversely-extending light source (for example, light source 60) is turned on, while the first transversely-extending light source (for example, light source 58) is off. During the scan, the imaging device 20 is moved along the longitudinal direction 14 across the print 402 while a second set of image data is obtained from the photodetector array 74.

Note that the steps of the second block 304 and third block 306 may be reversed. In other words, the second set of image data may be obtained first, and the first set of image data may be obtained next.

Together, the first and second sets of image data comprise a first pair of scanned images. The change in the angle of illumination from the first scanned image (the first set of image data) to the second scanned image (the second set of image data) is known because it is determined by the geometry of the imaging device 20 and the scanner 10.

With reference to the fourth block 308 of FIG. 3, the user may be prompted to rotate the print. For example, the prompt may comprise a message on a display screen of the scanner 10 or of a computer coupled to the scanner 10. In another example, the prompt may be an audio message. In accordance with an embodiment of the invention, the message may indicate that the user is to rotate the print by an approximate angle. In a preferred embodiment, the message may indicate that the user is to rotate the print by approximately ninety degrees in a clockwise (or alternatively, in a counter-clockwise) direction.

With reference to the fifth block 310 of FIG. 3 and FIG. 4, the user rotates 404 the print 402 by an angle. The rotation 404 is such that, after rotation 406, the print image of interest still faces down on the scanner platen 18. In accordance with an embodiment of the invention, the user does not have to achieve a precise rotation angle for the method 300 to work. As described below, the precise angle may be determined by minimizing a prediction error during the registration procedure. Two additional scans (third and fourth scans) are then performed by the scanner 10 on the rotated print 406.

With reference to the sixth block 312 in FIG. 3, in the third scan, only the first transversely-extending light source (for example, light source 58) is turned on, while the second transversely-extending light source (for example, light source 60) is off. During the scan, the imaging device 20 is moved along the longitudinal direction 14 across the rotated print 406 while a third set of image data is obtained from the photodetector array 74.

With reference to the seventh block 314 in FIG. 3, in the fourth scan, only the second transversely-extending light source (for example, light source 60) is turned on, while the first transversely-extending light source (for example, light source 58) is off. During the scan, the imaging device 20 is moved along the longitudinal direction 14 across the rotated print 406 while a fourth set of image data is obtained from the photodetector array 74.

Note that the steps of the sixth block 312 and seventh block 314 may be reversed. In other words, the fourth set of image data may be obtained first, and the third set of image data may be obtained next.

Together, the third and fourth sets of image data comprise a second pair of scanned images. The change in the angle of illumination from the third scanned image (the third set of image data) to the fourth scanned image (the fourth set of image data) is known because it is determined by the geometry of the imaging device 20 and the scanner 10.

With reference to the eighth block 316 in FIG. 3, the four sets of image data are processed to detect creases and/or tears. This data processing is described further below. An output of this step may include a bit-map or bit-mask that identifies which pixels correspond to damaged regions on the print (and so need to be replaced). Thereafter, with reference to the ninth block 318, "in-filling" and/or "in-painting" methods may be used to repair those damaged regions.

Figure 5:
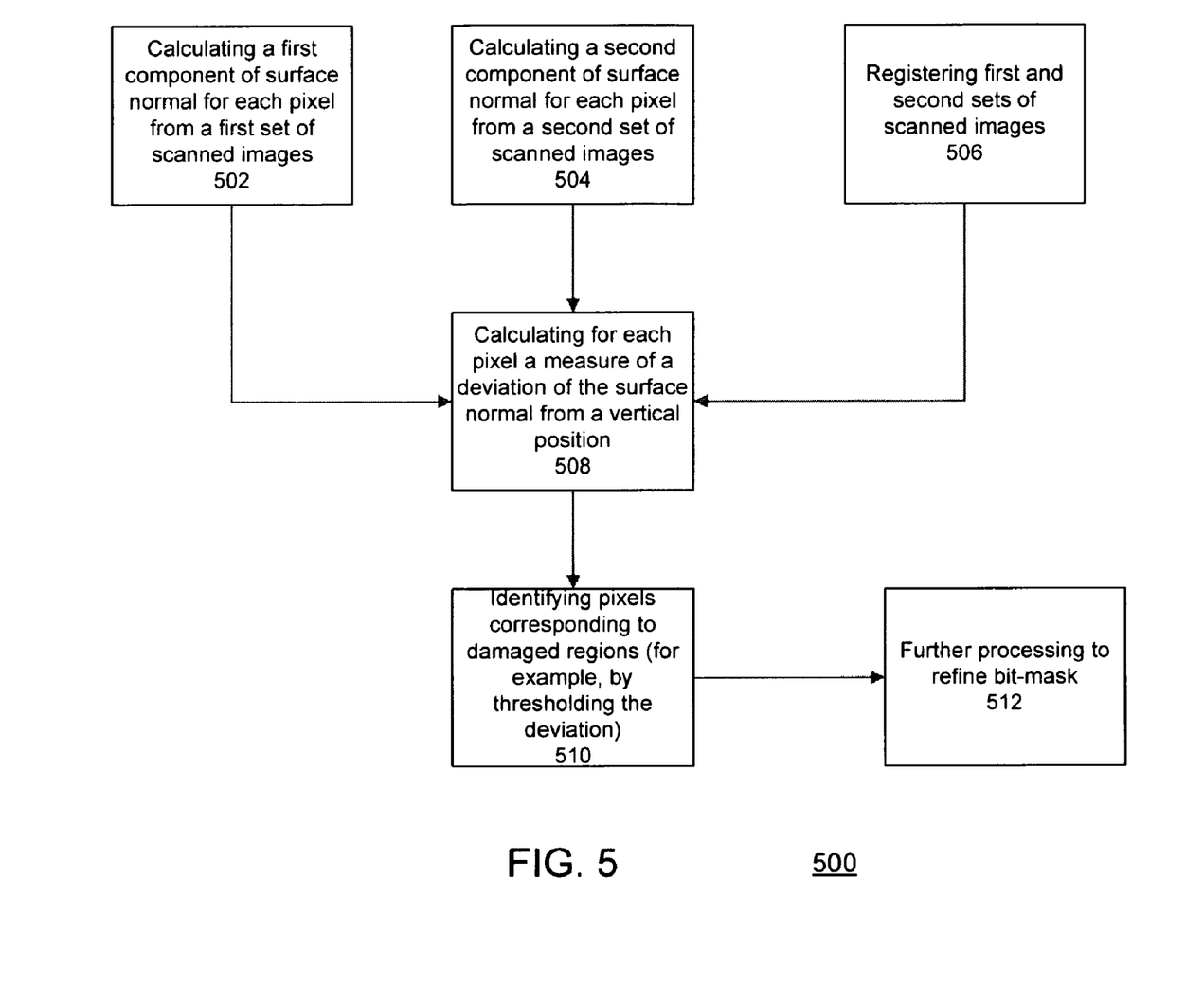
FIG. 5 is a flow chart depicting a method of detecting creases and/or tears in a scanned picture in accordance with an embodiment of the invention.

FIG. 5 is a flow chart depicting a processing method 500 of detecting creases and/or tears in prints in accordance with an embodiment of the invention. For example, this method 500 may be utilized in block 316 of the method 300 of FIG. 3.

This method 500 involves: calculating a first surface normal component for each pixel in the first set of scanned images (block 502); calculating a second surface normal component for each pixel in the second set of scanned images (block 504); registering the pixels of the first set of scanned images to the pixels of the second set of images (block 506); calculating a measure of a deviation of the surface normal from a vertical position for each pixel (block 508); and identifying pixels corresponding to the damaged regions, for example, by thresholding the calculated deviations (block 510). The output from these steps may comprise a bit-mask (or bit map) identifying those pixels corresponding to the damaged regions. An optional next step comprises further processing to refine the bit-mask (block 512).

With reference to the first block 502, a first component of a surface normal vector is calculated for each pixel from a first set of scanned images. For example, the first set of scanned images may be the first pair of scanned images obtained in blocks 304 and 306 in the procedure of FIG. 3. In that case, the first set of scanned images would include the first scanned image obtained with illumination from the first light source being scanned over the print (block 304) and the second scanned image obtained with illumination from the second light source being scanned over the print (block 306), where the print is in the same position while the first and second scanned images are obtained.

For example, the first component of the surface normal vector at each pixel may be calculated according to the following equations.

$$N_x = \frac{I_1 - I_2}{\alpha} \quad \text{(Equation 1)}$$

$$\alpha = \sqrt{(I_1+I_2)^2/3+(I_1-I_2)^2} \quad \text{(Equation 2)}$$

where $N_x$ is the x-component of the surface normal vector, $I_1$ is the intensity of a pixel in the first scanned image, $I_2$ is the intensity of a pixel in the second scanned image, and $\alpha$ is the surface albedo calculated from $I_1$ and $I_2$.

With reference to the second block 504, a second component of a surface normal vector is calculated for each pixel from a second set of scanned images. For example, the second set of scanned images may be the second pair of scanned images obtained in blocks 312 and 314 in the procedure of FIG. 3. In this case, the second set of scanned images would be obtained after rotation of the print on the platen (see block 310) and would include the third scanned image obtained with illumination from the first light source scanned over the print (block 312) and the fourth scanned image obtained with illumination from the second light source scanned over the print (block 314), where the print is in the same position while the third and fourth scanned images are obtained.

For example, the second component of the surface normal vector at each pixel may be calculated according to the following equations.

$$N_y = \frac{I_3 - I_4}{\alpha} \quad \text{(Equation 3)}$$

$$\alpha = \sqrt{(I_3+I_4)^2/3+(I_3-I_4)^2} \quad \text{(Equation 4)}$$

where $N_y$ is the y-component of the surface normal vector, $I_3$ is the intensity of a pixel in the third scanned image, $I_4$ is the intensity of a pixel in the fourth scanned image, and $\alpha$ is the surface albedo calculated from $I_3$ and $I_4$.

With reference to the third block 506, the first and second sets of scanned images are registered or aligned. Preferably, the two sets of scanned images are registered in an automated manner using an algorithm. One such algorithm described in detail below in relation to FIGS. 7-9. Alternatively, the two sets of scanned images may be registered by other algorithms, or even manually. For manual registration, for example, a software tool may be provided such that the user may translate and rotate an image from the first pair until it is visually registered with an image from the second pair.

Thereafter, with reference to the fourth block 508, a calculation may then be made for each pixel as to a measure of a deviation of the surface normal from a vertical position. For example, the deviation may be computed as a Euclidean distance based on the x and y components of the surface normal vector for each pixel. In other words, the deviation d may be computed for each pixel as follows.

$$d = \sqrt{N_x^2 + N_y^2} \quad \text{(Equation 5)}$$

Finally, with reference to the fifth block 510, this distance or deviation measure (from a vertical surface normal vector) may then be used to detect or identify those pixels which appear to be damaged (by virtue of the fact that their surface normal vector deviates substantially from vertical). For example, a threshold deviation may be applied such that pixels with deviations exceeding the threshold are identified as being from a damaged region of the print or as potentially being from a damaged region of the print. The pixels so identified may be output as a bit map or bit mask.

Optionally, with reference to the sixth block 512, further processing may be applied to refine the bit mask. For example, the bit mask may be processed to detect long thin structures which most likely correspond to image creases and/or tears. Once such long thin structures are detected, then those pixels that were not identified as damaged by the deviation measure described above, but are located within the boundaries of the long thin structures, may then be identified as being from a damaged region and so included in the subsequent repair process. In other words, the pixels within the boundaries of a detected structure for a damaged region may be associated with that damaged region.

Figure 6A:
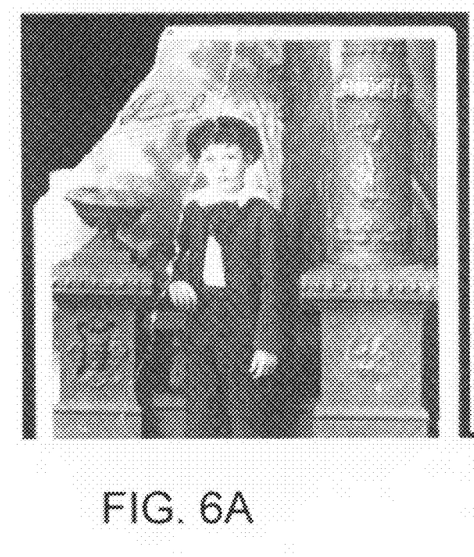
FIG. 6A shows an example photograph print with a crease and a tear.
Figure 6B:
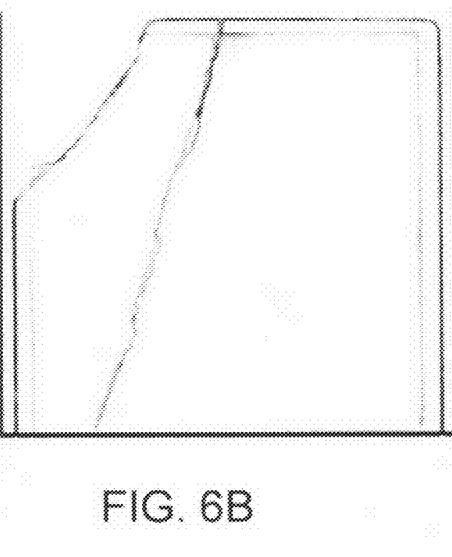
FIG. 6B shows a set of pixels (bit-mask) indicating regions of damage from the print of FIG. 6A in accordance with an embodiment of the invention.
Figure 6C:
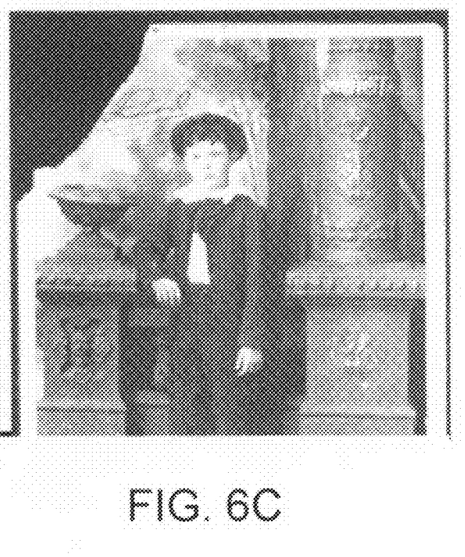
FIG. 6C shows the example print after reparations are made in accordance with an embodiment of the invention.

FIG. 6A shows an example photograph print with a crease and a tear. FIG. 6B shows a set of pixels (bit mask) indicating regions of damage (or potential damage) from the print of FIG. 6A in accordance with an embodiment of the invention. FIG. 6C shows the example print after reparations are made in accordance with an embodiment of the invention.

Figure 7:
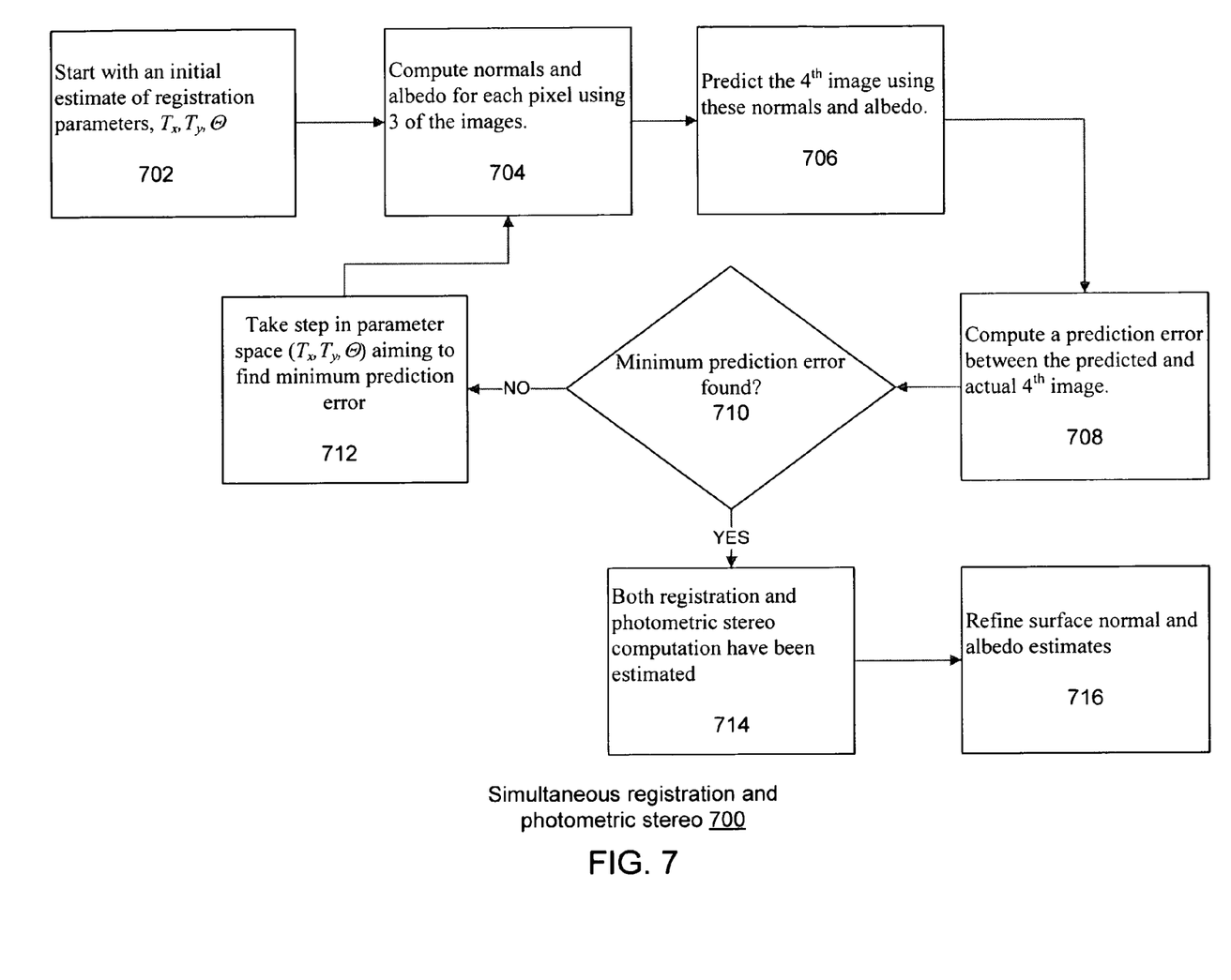
FIG. 7 is a flow chart depicting a method of registering the first and second pairs of scanned images in accordance with an embodiment of the invention.

FIG. 7 is a flow chart depicting a method 700 of registering the first and second pairs of scanned images in accordance with an embodiment of the invention. For example, this method 700 may be utilized in block 506 of the method 500 of FIG. 5.

This method 700 may be advantageously automated using software code and involves minimizing predicted error from photometric stereo calculations so as to determine the registration. Hence, this method 700 may be considered as performing "simultaneous" registration and photometric stereo.

With reference to the first block 702, the procedure starts with an initial estimate of the registration parameters. The registration parameters include x and y translation parameters, Tx and Ty, which indicates the x-y translation of the object between the two pairs of scans. The registration parameters also include an angle of rotation, $\Theta$, which indicates the rotation of the object between the two pairs of scans.

For example, in one implementation, the user is prompted to rotate the object by ninety degrees clockwise between the two pairs of scans. In that implementation, the initial estimate of the registration parameters may be Tx=0, Ty=0, and $\Theta$=90 degrees. In other words, in that implementation, the initial estimate may be no translation and 90 degree rotation.

With reference to the second block 704, using the current estimate of the registration parameters, photometric stereo calculations may be performed using three of the four images to compute surface normals and surface albedos for each pixel. For example, the first, second and third sets of image data may be used to compute per pixel surface normals and albedo. In another example, the second, third and fourth sets of image data may be used to compute per pixel surface normals and albedo.

With reference to the third block 706, the surface normals and surface albedo, along with the initial estimate of the registration parameters, may be used to generate a prediction of the remaining set of image data. Examples of the equations used in such a photometric stereo computation are discussed further below. For example, if the first, second and third sets of image data were used to compute per pixel surface normals and albedo, then a prediction may be generated for the fourth set of image data. In another example, if the second, third and fourth sets of image data may be used to compute per pixel surface normals and albedo, then a prediction may be generated for the first set of image data.

With reference to the fourth block 708, a prediction error is computed between the prediction of the remaining set of image data and the actual remaining set of image data. For example, if the first, second and third sets of image data were used to compute per pixel surface normals and albedo, then a prediction error is computed between the predicted fourth set of image data and the actual fourth set of image data. In one implementation, the prediction error may be a squared sum of differences in color values between the predicted and actual image pixels.

With reference to the fifth block 710, a determination is made as to whether the minimum prediction error has been found in the three-dimensional parameter space (two dimensions of translation and one dimension of rotation).

With reference to the sixth block 712, if it has not been determined that the minimum prediction error has been found, then a step is taken in parameter space aiming to find the minimum prediction error (and the parameters corresponding thereto).

In accordance with one embodiment of the invention, a compass search technique may be employed to find the minimum prediction error in parameter space. Other search techniques may be used in other embodiments. Other search techniques include Levenberg-Marquardt, Gradient Descent, Conjugant Gradient, Neider-Mead, Gauss-Newton, Netwon and other techniques.

After the step in the sixth block 712, the method 700 loops back to the step in block 704 where the photometric stereo calculations are performed, and so on. In other words, the search continues in parameter space to aiming to find the minimum prediction error.

With reference to the seventh block 714, if it is determined that the minimum prediction error has been found per block 710, then the best estimate of the registration of the object between the two pairs of images is given by the point in parameter space corresponding to the minimum prediction error. In addition, the estimated surface normals and albedo are those computed at the point in parameter space corresponding to the minimum prediction error.

With reference to the eighth block 716, the surface normal and albedo estimates may be modified or refined once the best estimate of the registration has been found.

One technique that may be applied for refining the surface normal and albedo estimates is to compute the final surface normals and albedo with a more accurate estimate of the rotation of the object. For lighting direction during the iteration, the computation may assume a specific (for example, 90 degree) rotation of the object, and hence the computation is made assuming that specific angle between lighting directions. After convergence, a more accurate estimate of the rotation (and hence the lighting) is determined (for example, 89 degrees). This more accurate estimate may be used to re-compute the final surface normals and albedo.

Another technique that may be applied for refining the surface normal and albedo estimates is to compute the albedo using just one set of lighting directions, instead of two lighting directions. This appears to be beneficial in that the effect any mis-registration between the two scans is prevented from adversely affecting the Albedo image.

While the above-discussed method 700 of automated registration is in accordance with an embodiment of the invention, some of the steps may be varied and/or additional steps may be added in other embodiments. For example, in accordance with a preferred embodiment of the invention, the photometric stereo calculation in block 704 may be performed using all four possible groupings of three of four images so as to generate predicted surface normals and albedo for each of the four images. Predictions may then be made as to each of the four images in block 706. The prediction error in block 706 may then be computed by comparing the predicted and actual pixel values for all four of the images.

Examples of the equations used in a photometric stereo computation in accordance with an embodiment of the invention are listed below. Given three or more images of a surface under known, but different, lighting directions, surface orientation (normals) and surface albedo may be recovered using such photometric stereo computation.

$$e = \alpha n \cdot l$$

$$L = (l_1^T, l_2^T, \ldots, l_m^T)^T$$

$$e = (e_1, e_2, \ldots, e_m)^T$$

$$n' = LE$$

$$n = n'/\alpha$$

Given a normalized vector pointing at each light, l, and a unit normal vector, n, a diffuse surface with albedo $\alpha$ will have brightness e. One may recover an unknown surface orientation vector n' by multiplying the inverse matrix of light directions, $L^+$, by a vector of measured brightness values per pixel, E. One way to computer $L^+$ from the matrix of lighting directions, L, is by taking the Moore-Penrose pseudoinverse of L. The surface orientation vector n' may then be normalized to recover the surface normal n.

Figure 8:
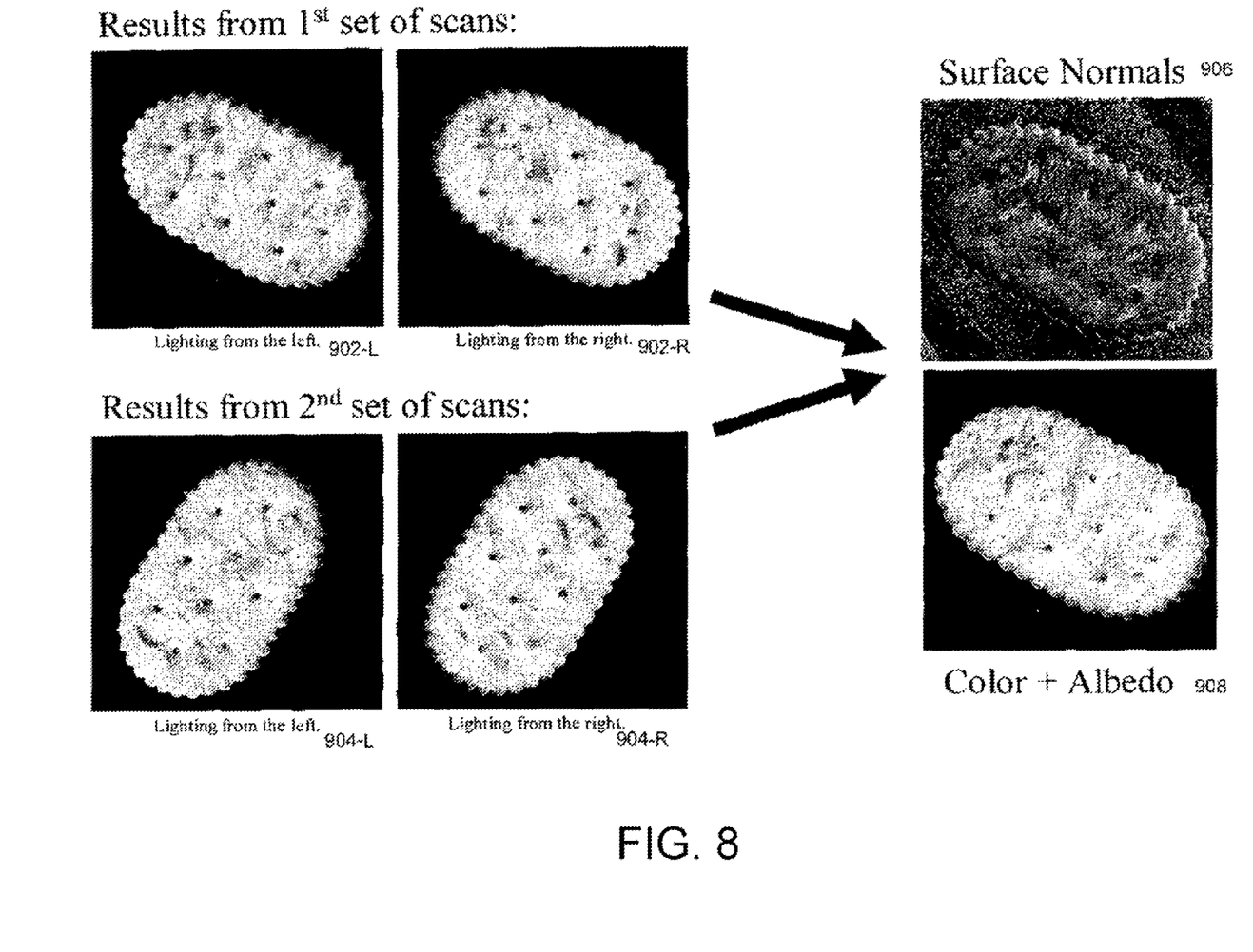
FIG. 8 depicts an example showing results of the simultaneous registration and photometric stereo algorithm in accordance with an embodiment of the invention.

FIG. 8 depicts an example showing results of the simultaneous registration and photometric stereo algorithm in accordance with an embodiment of the invention. In this example, the scanned object is a small cracker, rather than torn or creased print. The small cracker illustrates how the simultaneous registration and photometric stereo algorithm may be utilized to extract three-dimensional information within certain depth-of-field limitations.

The two images 902 resulting from the first pair of scans are shown in the upper left of FIG. 8. The first image 902-L is obtained with lighting from a left source, and the second image 902-R is obtained with lighting from a right source.

After rotating the cracker, the two images 904 from the second pair of scans are shown in the lower left of FIG. 8. The third image 904-L is obtained with lighting from a left source, and the fourth image 904-R is obtained with lighting from a right source.

After the registration and photometric stereo computation (either sequential or simultaneous), the resulting outputs may include surface normals 906 and color+albedo 908, in addition to the four registered images under different lighting conditions.

Note that the 3D structure obtained has a depth of field which depends on the depth-of-field of the imaging device. For example, the imaging device may have a depth-of-field of about one centimeter. In that case, the depth-of-field of the 3D structure obtained would also be about one centimeter.

In an alternate embodiment of the invention, the detection of creases and/or tears may be performed with only two scans of a print. As discussed below with reference to FIG. 9, this procedure may go from the second scan directly to processing the image to detect creases and/or tears. In such a procedure, less information would be used for the detection of the damaged regions. Advantageously, this embodiment shortens the scanning procedure from the user's point of view. Disadvantageously, this embodiment detects the damaged regions with less accuracy.

Figure 9:
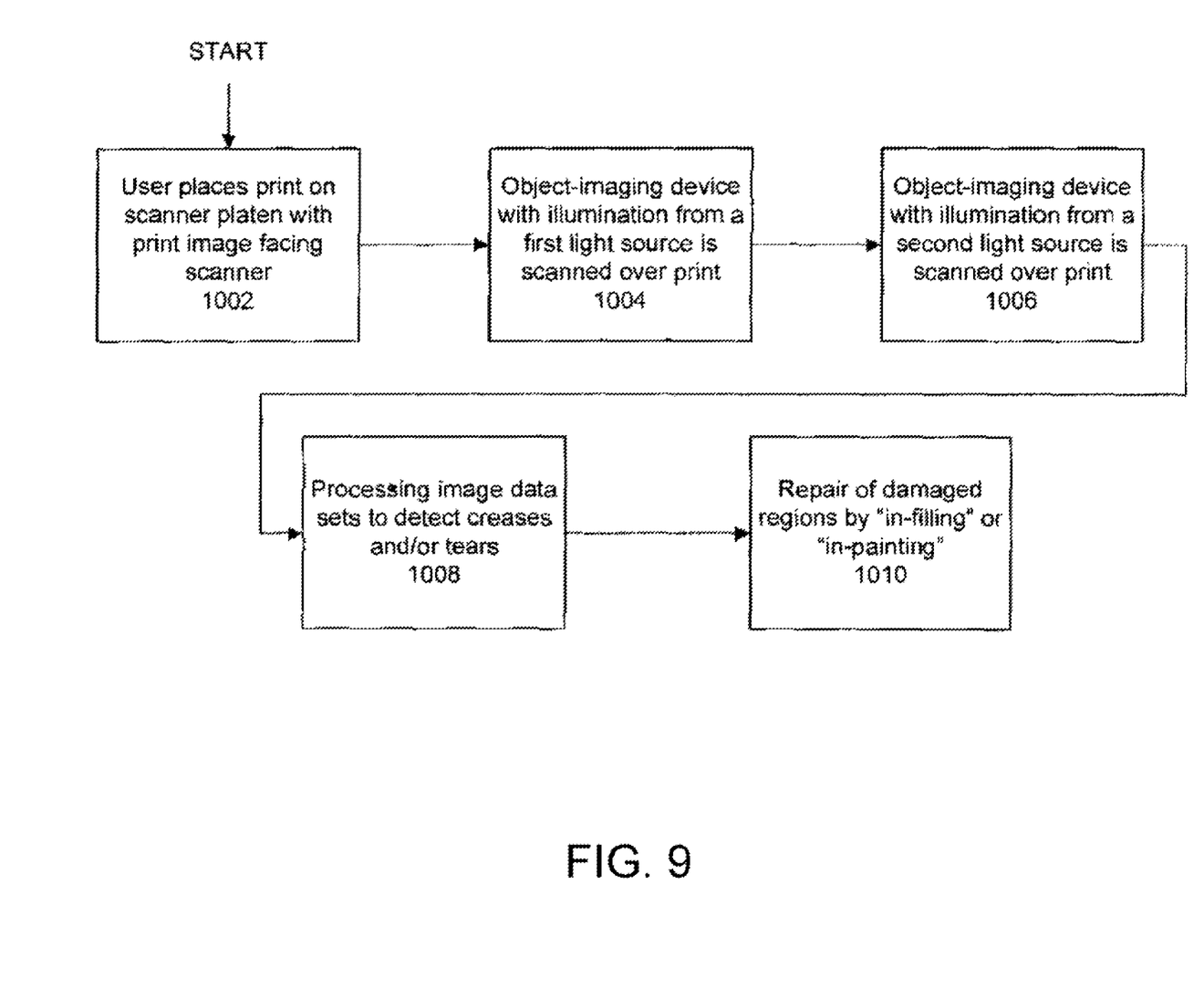
FIG. 9 is a flow chart of a method for scanning using scanner hardware in accordance with an embodiment of the invention.

FIG. 9 is a flow chart of a method 1000 for scanning using scanner hardware in accordance with an embodiment of the invention. The method 1000 may be performed, in part, using computer-executable instructions configured to control the scanner and process data. The computer-executable instructions may be, for example, stored at a data storage device and executed by a processor within the scanner control system 90.

With reference to the first block 1002 in FIG. 9, a user places a print on the scanner platen 18. The print is placed with the side having the print image of interest facing down on the scanner platen 18. In other words, the print is placed with the image to be scanned facing towards the imaging device 20. Two scans are then performed by the scanner 10 with the print in this position.

With reference to the second block 1004 in FIG. 9, in the first scan, only a first transversely-extending light source (for example, light source 58) is turned on, while a second transversely-extending light source (for example, light source 60) is off. During the scan, the imaging device 20 is moved along the longitudinal direction 14 across the print while a first set of image data is obtained from the photodetector array 74.

With reference to the third block 1006 in FIG. 9, in the second scan, only the second transversely-extending light source (for example, light source 60) is turned on, while the first transversely-extending light source (for example, light source 58) is off. During the scan, the imaging device 20 is moved along the longitudinal direction 14 across the print while a second set of image data is obtained from the photodetector array 74.

Note that the steps of the second block 1004 and third block 1006 may be reversed. In other words, the second set of image data may be obtained first, and the first set of image data may be obtained next.

Together, the first and second sets of image data comprise a first pair of scanned images. The change in the angle of illumination from the first scanned image (the first set of image data) to the second scanned image (the second set of image data) is known because it is determined by the geometry of the imaging device 20 and the scanner 10.

With reference to the fourth block 1008 in FIG. 9, the two sets of image data are processed to detect creases and/or tears. This data processing is described further below in relation to FIG. 10. An output of this step may include a bit-map or bit-mask that identifies which pixels correspond to damaged regions on the print (and so need to be replaced). Thereafter, with reference to the fifth block 1010, "in-filling" and/or "in-painting" methods may be used to repair those damaged regions.

Figure 10:
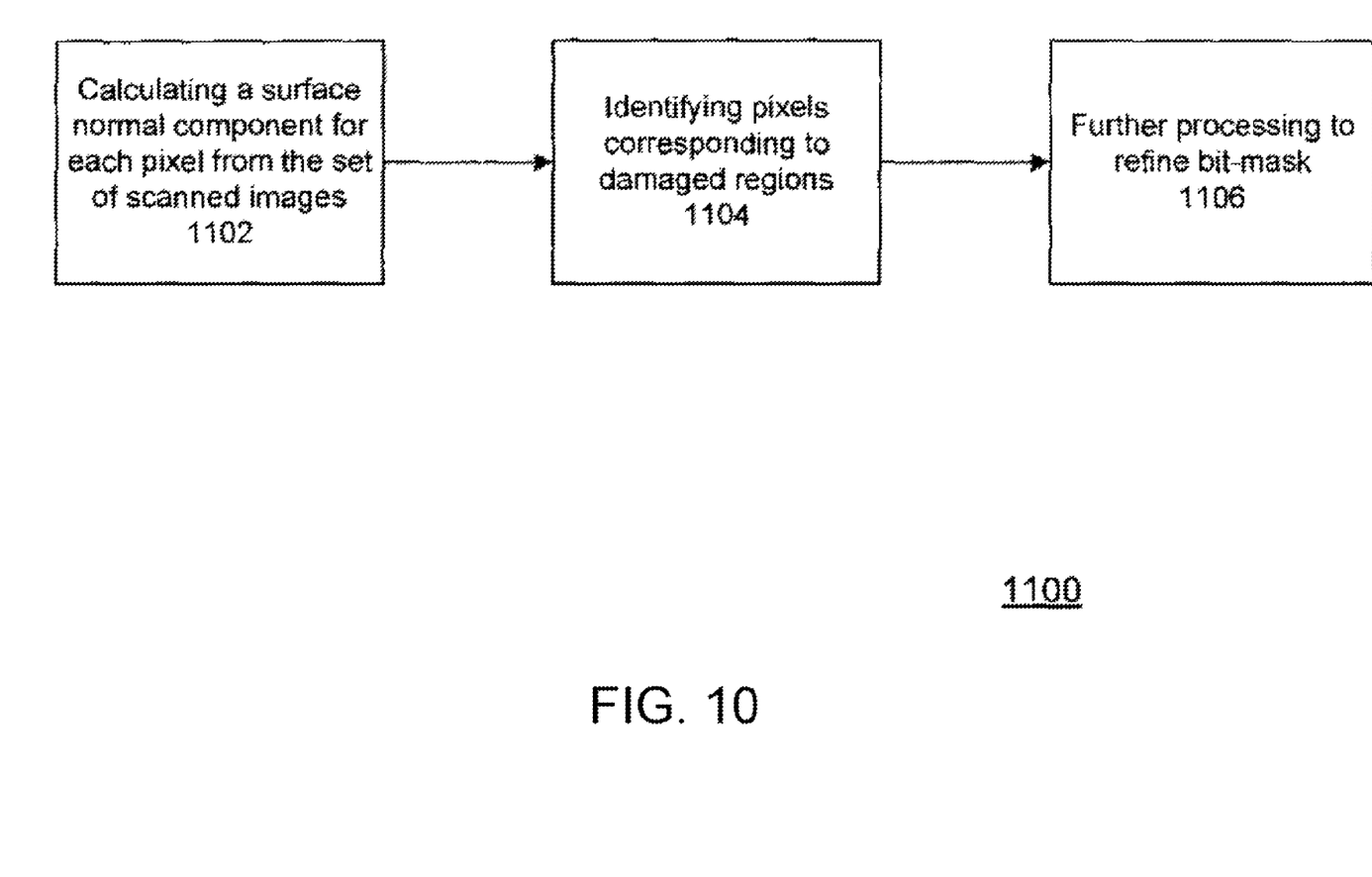
FIG. 10 is a flow chart depicting a method of detecting creases and/or tears in a scanned picture in accordance with an embodiment of the invention.

FIG. 10 is a flow chart depicting a method of detecting creases and/or tears in a scanned picture in accordance with an embodiment of the invention.

With reference to the first block 1102, a component of a surface normal vector is calculated for each pixel from a set of scanned images. For example, the set of scanned images may be the pair of scanned images obtained in blocks 1004 and 1006 in the procedure of FIG. 9. In that case, the set of scanned images would include the first scanned image obtained with illumination from the first light source being scanned over the print (block 1004) and the second scanned image obtained with illumination from the second light source being scanned over the print (block 1006), where the print is in the same position while the first and second scanned images are obtained.

For example, the component of the surface normal vector at each pixel may be calculated according to the following equations.

$$N_x = \frac{I_1 - I_2}{\alpha} \quad \text{(Equation 1)}$$

$$\alpha = \sqrt{(I_1+I_2)^2/3 + (I_1-I_2)^2} \quad \text{(Equation 2)}$$

where $N_x$ is the x-component of the surface normal vector, $I_1$ is the intensity of a pixel in the first scanned image, $I_2$ is the intensity of a pixel in the second scanned image, and $\alpha$ is the surface albedo calculated from $I_1$ and $I_2$. This x-component of the surface normal vector may be thought of as indicating a deviation of the surface normal vector in the x-dimension.

With reference to the second block 1104, this component of the surface normal vector may then be used to detect or identify those pixels which appear to be damaged. For example, a threshold deviation may be applied such that pixels with component magnitudes exceeding the threshold are identified as being from a damaged region of the print or as potentially being from a damaged region of the print. The pixels so identified may be output as a bit map or bit mask.

With reference to the third block 1106, further processing may then be applied to refine the bit mask. For example, the bit mask may be processed to detect long thin structures which most likely correspond to image creases and/or tears. Once such long thin structures are detected, then those pixels that were not identified as damaged by the deviation measure described above, but are located within the boundaries of the long thin structures, may then be identified as being from a damaged region and so included in the subsequent repair process. In other words, the pixels within the boundaries of a detected structure for a damaged region may be associated with that damaged region.

In another alternate embodiment, instead of having a user rotate the object between pairs of scans per blocks 308 and 310 in FIG. 3, the scanner apparatus may be configured such that the imaging device may be rotated. For instance, the imaging device may be rotated by ninety degrees. In that case, instead of having a user rotate the object, the imaging device may be rotated by ninety degrees after the first pair of scans and before taking at least a third scan. As a further advantage of such an apparatus, knowing the angle of rotation with precision facilitates registration of the images.

In another alternate embodiment, instead of having a user rotate the object between pairs of scans, the scanner apparatus may be configured with a second imaging device. For instance, the second imaging device may scan the object at a ninety-degree angle to the first imaging device. In that case, instead of having a user rotate the object, the first imaging device may perform the first pair of scans and the second imaging device may perform at least a third scan. Again, as a further advantage of such an apparatus, knowing the angle of rotation with precision facilitates registration of the images.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method comprising:
    capturing images of a document having a surface, wherein the capturing comprises
        scanning across the document surface in a first scan direction in relation to orientation of the document multiple scan lines respectively illuminated from different illumination angles relative to the document surface,
        scanning across the document surface in a second scan direction in relation to orientation of the document multiple scan lines respectively illuminated from different illumination angles relative to the document surface, the first and second scan directions being different, and
        generating the captured images from scan line illumination reflected from the document surface during the scanning of respective ones of the scan lines across the document surface; and
    detecting defects in the document based on the captured images, wherein the detecting comprises detecting at least one of a crease or a tear in the document;
    wherein the capturing and the detecting are performed by a scanning apparatus.

2. The method of claim 1, further comprising outputting a bit mask indicative of any defects detected in the document.

3. The method of claim 1, wherein the detecting comprises:
    calculating a first component of a surface normal vector at each pixel from a first set of the captured images generated during the scanning of respective ones of the scan lines across the surface in the first scan direction in relation to orientation of the document; and
    calculating a second component of the surface normal vector at each pixel from a second set of captured images generated during the scanning of respective ones of the scan lines across the surface in the second scan direction in relation to orientation of the document.

4. The method of claim 3, wherein the detecting comprising:
    registering the first and second sets of scanned images.

5. The method of claim 4, wherein the detecting comprises:
    calculating a deviation of the surface normal vector at each pixel.

6. The method of claim 5, wherein the detecting comprises:
    thresholding the deviation of the surface normal vector at each pixel so as to detect pixels associated with damaged regions, said detected pixels forming a bit mask.

7. The method of claim 6, wherein the detecting comprises:
    detecting a structure for a damaged region within the bit mask.

8. The method of claim 1, wherein the capturing comprises using an imaging device having two light sources that are operable to illuminate the document surface with respective scan lines from the different respective illumination angles, and wherein the capturing comprises using only one of the light sources at a time during a respective scanning of a respective scan line across the document surface.

9. The method of claim 8, wherein the scanning of the scan lines in first and second scan directions comprises scanning the scan lines in a fixed direction in relation to the scanning apparatus with the document oriented in first and second orientations in relation to the scanning apparatus.

10. A scanning apparatus, comprising:
    a scanner platen operable to support a document having a surface;
    an imaging device operable to perform operations comprises capturing images of a document having a surface, wherein in the capturing the imaging device is operable to perform operations comprising
        scanning across the document surface in a first scan direction in relation to orientation of the document multiple scan lines respectively illuminated from different illumination angles relative to the document surface, and
        scanning across the document surface in a second scan direction in relation to orientation of the document multiple scan lines respectively illuminated from different illumination angles relative to the document surface, the first and second scan directions being different; and
    a processor operable to perform operations comprising generating the captured images from scan line illumination reflected from the document surface during the scanning of respective ones of the scan lines across the document surface, and detecting defects in the document based on the captured images, wherein the detecting comprises detecting at least one of a crease or a tear in the document.

11. The apparatus of claim 10, wherein the imaging device comprises two light sources that are operable to illuminate the document surface with respective scan lines from the different respective illumination angles, and wherein in the capturing the imaging device is operable to use only one of the light sources at a time during a respective scanning of a respective scan line across the document surface.

12. The apparatus of claim 11, wherein the processor is operable to perform operations comprising:
    after the scanning of the scan lines across the document surface in the first scan direction, prompting a user to rotate the document; and
    after the document has been rotated, directing the imaging device to perform the scanning of scan lines across the document surface in the second scan direction.

13. The apparatus of claim 10, wherein in the detecting the processor is operable to perform operations comprising:
  calculate a first component of a surface normal vector at each pixel from a first set of the captured images generated during the scanning of respective ones of the scan lines across the surface in the first scan direction in relation to orientation of the document; and
  calculate a second component of the surface normal vector at each pixel from a second set of captured images generated during the scanning of respective ones of the scan lines across the surface in the second scan direction in relation to orientation of the document.

14. The apparatus of claim 13, wherein in the detecting the processor is operable to perform operations comprising registering the first and second sets of scanned images and to calculate a deviation of the surface normal vector at each pixel.

15. The apparatus of claim 14, wherein in the detecting the processor is operable to perform operations comprising thresholding the deviation of the surface normal vector at each pixel so as to detect pixels associated with damaged regions, said detected pixels forming a bit mask.

16. The apparatus of claim 15, wherein in the detecting the processor is operable to perform operations comprising detecting a structure for a damaged region within the bit mask and to associate pixels within the structure with the damaged region for inclusion in a subsequent repair process.

17. A scanning system, comprising:
  a scanner platen operable to support a document having a surface;
  an imaging device operable to perform operations comprises capturing two-dimensional images of the document, wherein the imaging device comprises two light sources that are operable to illuminate the document surface with respective scan lines from the different respective illumination angles, and in the capturing the imaging device is operable to perform operations comprising
    scanning across the document surface in a first scan direction in relation to orientation of the document multiple scan lines respectively illuminated from different illumination angles relative to the document surface, and
    scanning across the document surface in a second scan direction in relation to orientation of the document multiple scan lines respectively illuminated from different illumination angles relative to the document surface, the first and second scan directions being different; and
  at least one processor operable to perform operations comprising generating the captured images from scan line illumination reflected from the document surface during the scanning of respective ones of the scan lines across the document surface, and detecting defects in the document based on the captured images, wherein the detecting comprises detecting at least one of a crease or a tear in the document.

18. The system of claim 17, wherein in the detecting the processor is operable to perform operations comprising:
  calculating a first component of a surface normal vector at each pixel from a first set of the captured images generated during the scanning of respective ones of the scan lines across the surface in the first scan direction in relation to orientation of the document;
  calculating a second component of the surface normal vector at each pixel from a second set of the captured images generated during the scanning of respective ones of the scan lines across the surface in the second scan direction in relation to orientation of the document; and
  registering the first and second sets of scanned images and to calculate a deviation of the surface normal vector at each pixel.

19. The system of claim 18, wherein in the detecting the processor is operable to perform operations comprising thresholding the deviation of the surface normal vector at each pixel so as to detect pixels associated with damaged regions, said detected pixels forming a bit mask.

20. A non-volatile computer-readable storage medium comprising computer-readable program instructions, which when executed by a processor, causes the processor to perform operations comprising:
  calculating a first component of a surface normal vector at each pixel from a first set of images generated during scanning across a document surface in a first scan direction in relation to orientation of the document multiple scan lines respectively illuminated from different illumination angles relative to the document surface;
  calculating a second component of the surface normal vector at each pixel from a second set of images generated during scanning across the document surface in a second scan direction in relation to orientation of the document multiple scan lines respectively illuminated from different illumination angles relative to the document surface, the first and second scan directions being different; and
  registering the first and second sets of scanned images and to calculate a deviation of the surface normal vector at each pixel; and
  thresholding the deviation of the surface normal vector at each pixel so as to detect pixels associated with damaged regions, said detected pixels forming a bit mask.

* * * * *